No. 763,258. PATENTED JUNE 21, 1904.
A. CASTELIN.
LAND ANCHOR.
APPLICATION FILED FEB. 17, 1904.
NO MODEL. 3 SHEETS—SHEET 1.

Witnesses:
Francis R. Erney.
C. D. Kesler.

Inventor
André Castelin
By James L. Norris
Atty.

No. 763,258. PATENTED JUNE 21, 1904.
A. CASTELIN.
LAND ANCHOR.
APPLICATION FILED FEB. 17, 1904.
NO MODEL. 3 SHEETS—SHEET 2.

No. 763,258. PATENTED JUNE 21, 1904.
A. CASTELIN.
LAND ANCHOR.
APPLICATION FILED FEB. 17, 1904.
NO MODEL. 3 SHEETS—SHEET 3.
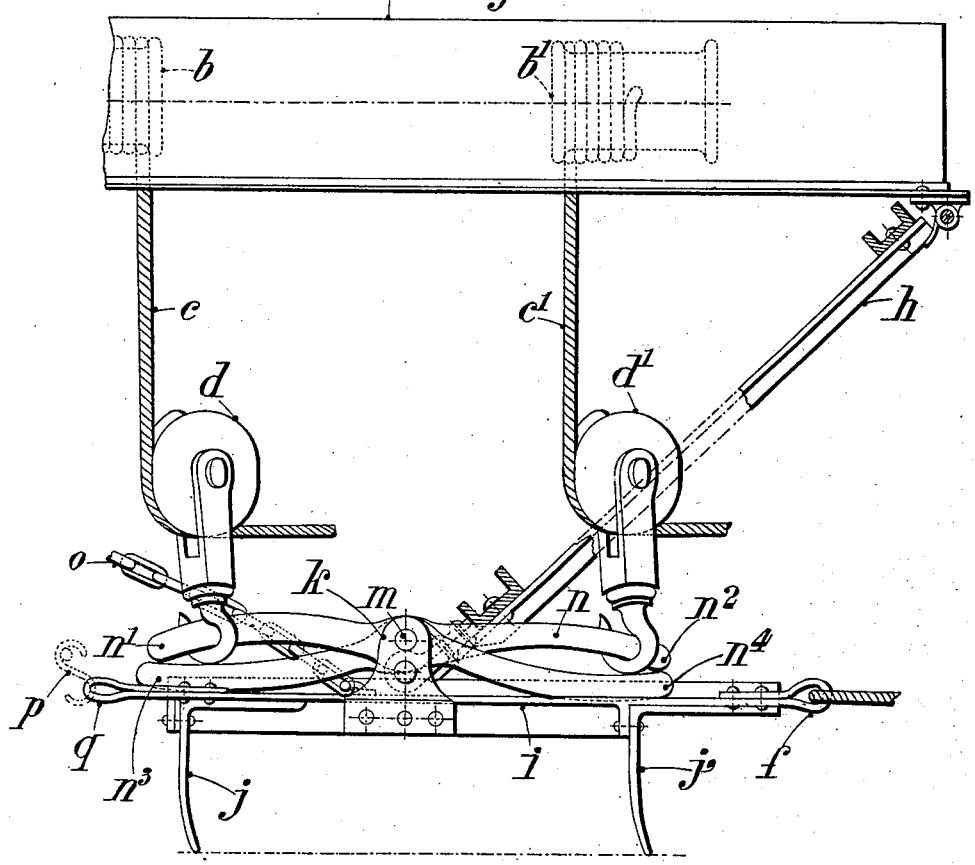
Fig. 3.
Fig. 4.
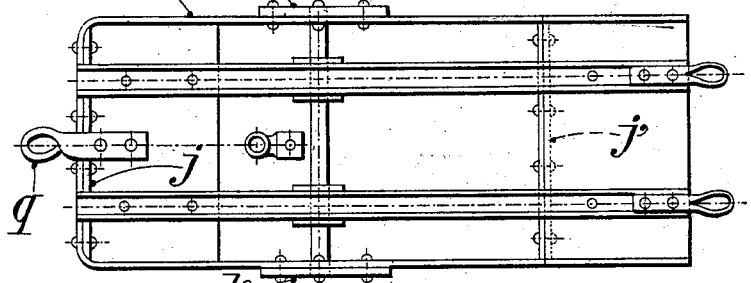
Witnesses:
Francis R. Erney.
C. D. Kesler.
Inventor
André Castelin
By James L. Norris.
Atty.

No. 763,258.

Patented June 21, 1904.

UNITED STATES PATENT OFFICE.

ANDRÉ CASTELIN, OF PARIS, FRANCE, ASSIGNOR TO SOCIÉTÉ ANONYME D'ETUDE ET D'EXPLOITATION DES BREVETS A. CASTELIN POUR MACHINES AGRICOLES AUTOMOBILES, PUTEAUX, DEPARTMENT OF SEINE, FRANCE.

LAND-ANCHOR.

SPECIFICATION forming part of Letters Patent No. 763,258, dated June 21, 1904.

Application filed February 17, 1904. Serial No. 194,076. (No model.)

*To all whom it may concern:*

Be it known that I, ANDRÉ CASTELIN, engineer, a citizen of the French Republic, residing at Paris, France, have invented certain new and useful Improvements in Land-Anchors, of which the following is a specification.

This invention relates to improvements in the method of securing to the ground traction-engines used in agriculture for operating the cables of plows, harvesters, and the like. In such arrangements the traction-engine is usually made to draw the agricultural machine or implement in a direction at right angles to its major axis—that is to say, parallel to the axis of its wheels—and as the stability of the engine is somewhat weak in this direction special precautions have to be taken to prevent its being capsized.

According to the present invention I employ devices intended to enter the ground, which I will term "spades," which are automatically forced into the soil during the working of the machine or implement and which can be readily withdrawn therefrom when required.

I will describe the nature of this invention with reference to the accompanying drawings.

Figure 1:
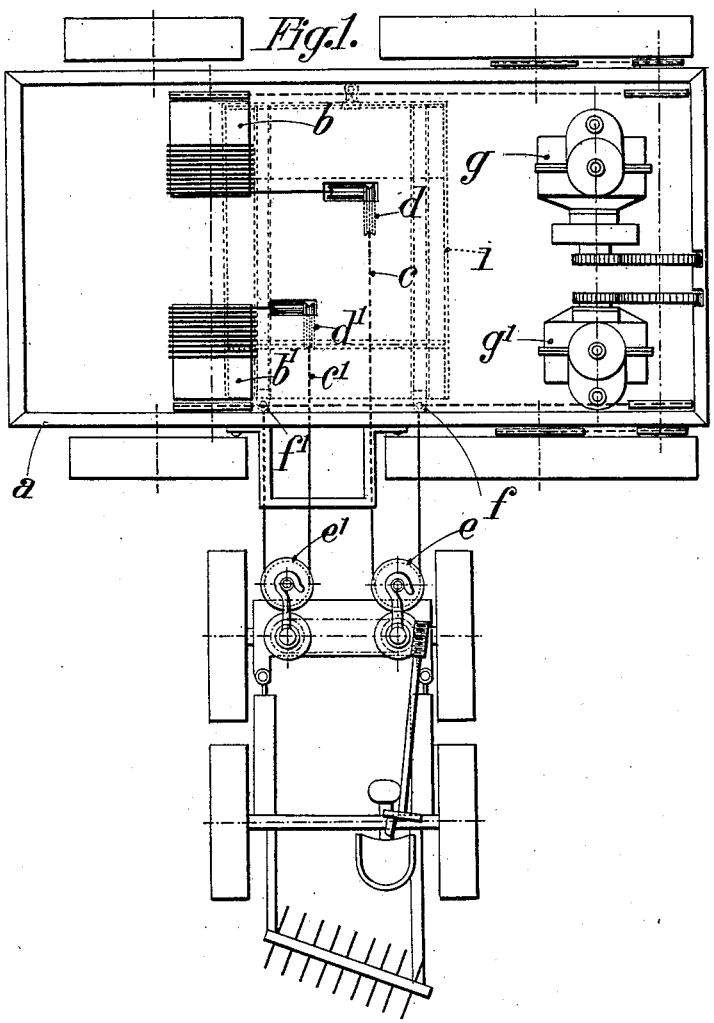
Figure 2:
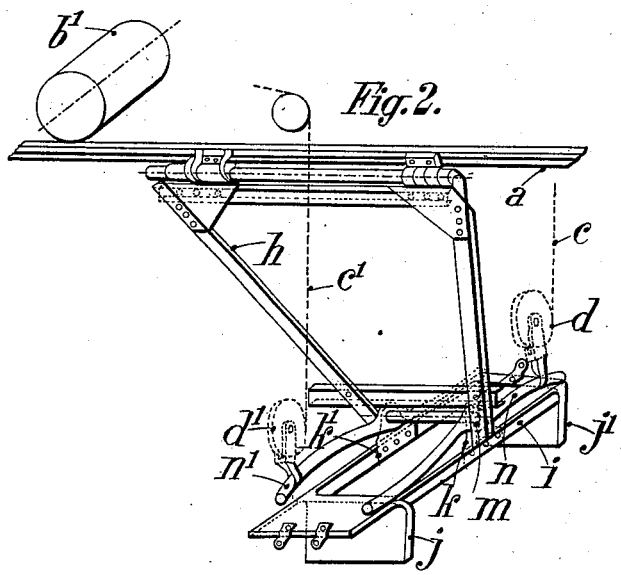

Figure 1 shows diagrammatically a traction-engine for a plow, the latter being supposed to be drawn toward the former. Fig. 2 shows in perspective the means employed for securing the traction-engine firmly to the ground, while Figs. 3 and 4 show the arrangement in elevation and plan, respectively.

The traction-engine $a$ carries drums $b\,b'$, on which are wound the cables $c\,c'$ for drawing the plow. Each of the cables $c\,c'$ passes over a guide-pulley $d\,d'$, carried on the engine, then over a pulley $e\,e'$, carried on the plow, finally returning to a hook $f\,f'$, fast on the engine. The two drums may be driven simultaneously or independently of each other by one or two motors $g\,g'$ on the said engine.

The arrangement for preventing the traction-engine being upset or overturned during the operation of the plow or other machine or implement comprises a frame $h$ of trapeze form hinged or similarly connected to the base-plate or frame of the traction-engine on the side where the traction of the plow takes place. This frame is pivotally connected at its lower part to the opposite sides of a plate or frame $i$ about the central portion thereof, which plate or frame carries at its two ends curved or bent plates constituting spades or the like $j\,j'$, arranged parallel to the major axis of the traction-engine and capable of being forced into the ground.

The plate or frame $i$ is provided centrally, or thereabout, with two supports or bearings $k\,k'$, carrying a shaft $m$ parallel to the two spades $j\,j'$ and to the longitudinal base-plates of the traction-engine. On the shaft $m$ are pivoted levers $n\,n'$. The cable $c'$ being wound on the drum $b'$ passes round the pulley $d'$, the hook of which engages in the end $n^2$ of the lever $n$. The cable then passes round the pulley on the plow and returning is secured to the ring $f'$, fixed on the front part of the plate $i$. When the plow is drawn toward the engine, the tension on the cable tends to raise the pulley $d'$, and consequently the end $n^2$ of the lever $n$. The other end, $n^3$, of the said lever bearing on the plate $i$ tends to force the spade $j$ into the ground, and this is also further effected by the tension on the cable where it is secured at $f'$ by the rotation of the trapeze at its upper end displacing the spade in the direction of the plow. The cable $c$, wound on the drum $b$, passes over the pulley $d$ in like manner. This second pulley is hooked to one end of the second lever $n'$, arranged to operate in a reverse direction to the lever $n$. The action will be analogous to that of the first lever already described, the other end, $n^4$, of the said lever $n'$ bearing on the plate $i$ above the spade $j'$ and in a similar manner forcing this latter into the ground.

The amount of penetration of the spades into the ground is determined or limited by a chain $o$, fixed at one of its ends to the traction-engine on the opposite side to which the trapeze $h$ is secured and at its other end to a ring carried by the plate $i$.

When the chain is in tension, the forward movement of the spades into the soil is arrested. The tendency of the traction-engine to be overthrown or upset is thus rendered practically impossible by reason of the short distance of the cables drawing the plow above the ground, a distance which can be diminished as desired by making the chain *o* of a suitable length.

In order to withdraw the spades from the ground, one hook of a multiple pulley is made fast on the frame of the traction-engine on the side opposite to which the part *h* is hinged. The other hook, *p*, connected to the former by the ordinary tackle, is passed through a ring *q* at the rear of the plate *i*. By operating one of the chains of the said multiple pulley the spades will be readily extracted from the ground.

Having thus described my invention and in what manner the same may be performed, I declare that what I claim is—

1. A device for securing to the ground traction-engines used in agriculture for operating the cables of plows harvesters, and the like having two spades carried by a horizontal plate hinged to a frame of trapeze form pivotally connected to the frame of the traction-engine, two arm-levers hinged to the said horizontal plate bearing by one of their ends on the said plate, a pulley hooked at the other end of each one of these said levers, round which passes the traction-cables, hooks fast at one of the ends of the horizontal plate in which the ends of the traction-cables are fixed, means for limiting the forward movement of the spades into the soil, and means for withdrawing the spades from the ground, substantially as described.

2. A device for securing to the ground traction-engines used in agriculture for operating the cables of plows harvesters, and the like having two spades carried by a horizontal plate hinged to a frame of trapeze form pivotally connected to the frame of the traction-engine, two arm-levers hinged to the said horizontal plate bearing by one of their ends on the said plate, a pulley hooked at the other end of each one of these said levers, round which passes the traction-cables, hooks fast at one of the ends of the horizontal plate in which the ends of the traction-cables are fixed, a chain fixed at one of its ends to the center of the said horizontal plate and to the traction-engine on the opposite side to which the trapeze is secured, and means for withdrawing the spades from the ground, substantially as described.

3. A device for securing to the ground traction-engines used in agriculture for operating the cables of plows harvesters, and the like having two spades carried by a horizontal plate hinged to a frame of trapeze form pivotally connected to the frame of the traction-engine, two arm-levers hinged to the said horizontal plate bearing by one of their ends on the said plate, a pulley hooked at the other end of each one of these said levers, round which passes the traction-cables, hooks fast at one of the ends of the horizontal plate in which the ends of the traction-cables are fixed, a chain fixed at one of its ends to the center of the said horizontal plate and to the traction-engine on the opposite side to which the trapeze is secured, a multiple pulley connected to the traction-engine on the opposite side to which the trapeze is secured and to a hook on the horizontal plate, substantially as described.

In testimony whereof I have hereunto set my hand in presence of two subscribing witnesses.

ANDRÉ CASTELIN.

Witnesses:
HANSON C. COXE,
PAUL BLUM.